US008706597B1

(12) United States Patent
Forsythe

(10) Patent No.: US 8,706,597 B1
(45) Date of Patent: Apr. 22, 2014

(54) INTERACTIVE USER INTERFACE FOR INPUT OF FORECASTS AND RISK PRIORITIES AND DISPLAY OF RELATED STRATEGIES IN A TRADING SYSTEM

(75) Inventor: Aric Forsythe, Chicago, IL (US)

(73) Assignee: tradeMONSTER Group, Inc., Chicago, IL (US)

( * ) Notice: Subject to any disclaimer, the term of this patent is extended or adjusted under 35 U.S.C. 154(b) by 755 days.

(21) Appl. No.: 12/655,079

(22) Filed: Dec. 21, 2009

(51) Int. Cl.
*G06Q 40/00* (2012.01)

(52) U.S. Cl.
USPC .............................. 705/36 R; 705/35; 705/37

(58) Field of Classification Search
USPC ........................................... 705/36 R, 35, 36
See application file for complete search history.

(56) References Cited

U.S. PATENT DOCUMENTS 7,624,060 B2 * 11/2009 Michaud et al. ............ 705/36 R
7,788,167 B1 * 8/2010 Deitz et al. ..................... 705/37
7,853,510 B2 * 12/2010 Zosin et al. ................ 705/36 R
7,882,001 B2 * 2/2011 Nahum ........................... 705/35
8,126,794 B2 * 2/2012 Lange et al. ............... 705/36 R

OTHER PUBLICATIONS

Charlie Santaularia, OptionVue 5 Options Analysis, Dec. 12, 2007, Jan. 2008 issue, Futures Magazine.
David Penn, OptionVue 5, Product Review, May 2005, 6 pages, vol. 23:5 (64-67, 94), Stocks & Commodities.
John Sweeney, OptionVue 5, Product Review, 1998, 5 pages, vol. 16:14 (669-673), Stocks & Commodities.
OptionVue 6, Getting Started Guide, Jan. 23, 2009, 62 pages, OptionVue Systems.
The Vertical Call Spread: Nautralize Risk, Capture Profits, Jun. 2005, 39 pages, vol. 1, No. 3, Options Trader.

* cited by examiner

*Primary Examiner* — Harish T Dass
*Assistant Examiner* — Siegfried E Chencinski
(74) *Attorney, Agent, or Firm* — Lempia Summerfield Katz LLC

(57) ABSTRACT

A system for inputting a forecast and/or a risk priority and displaying an associated strategy for a trading system comprises a processor and a memory. The processor is configured to receive an indication of a forecast for an underlying investment and/or an indication of a risk priority. The processor is configured to display and/or cause the display of the probability band and/or a list of risk priorities. The processor is further configured to determine a probability band based at least in part on the forecast and display or cause a display of one or more strategies compatible with the forecast or to determine an ordered list of risk priorities and display or cause a display of one or more strategies compatible with the ordered list. The memory is coupled to the processor and configured to provide the processor with instructions.

21 Claims, 20 Drawing Sheets

INTERACTIVE USER INTERFACE FOR INPUT OF FORECASTS AND RISK PRIORITIES AND DISPLAY OF RELATED STRATEGIES IN A TRADING SYSTEM

BACKGROUND OF THE INVENTION

In systems that search live market data for option strategies it is difficult to quickly and easily capture both the diversity and exactness of inputs needed for the trader to conduct a meaningful search against data changing in real time and act on the resulting output.

BRIEF DESCRIPTION OF THE DRAWINGS

Various embodiments of the invention are disclosed in the following detailed description and the accompanying drawings.

DETAILED DESCRIPTION

Figure 1:
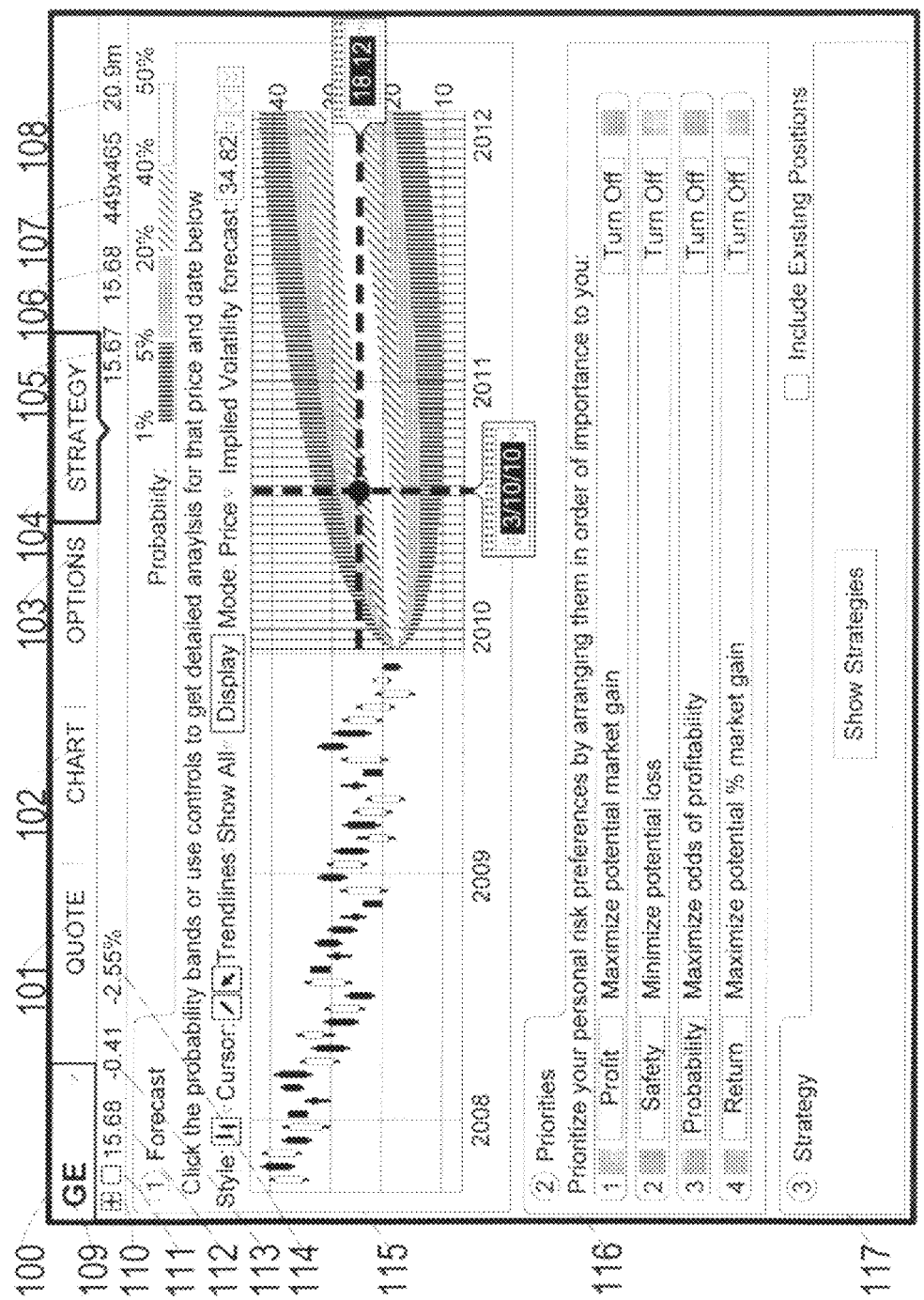
FIG. 1 is a screen shot illustrating an embodiment of the StrategySEEK module.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for inputting a forecast or an order for one or more risk priorities is disclosed. In some embodiments, the system receives an indication of a forecast for an underlying investment, determines a probability band based at least in part on the forecast, causes a display of the probability band (e.g., a display of the probability band on a monitor or display of a computing device), and causes a display of one or more strategies compatible with the forecast. In some embodiments, the system receives an indication of an order for one or more risk priorities, determines an ordered list based on the received order, causes a display of the ordered list, and causes a display of one or more strategies compatible with the ordered list.

In some embodiments, the system comprises a tool, StrategySEEK, that enables the trader to input a forecast and prioritize the types of risk/reward characteristics most acceptable to the trader for an underlying security and automatically derive and display strategies related to that forecast. The trader can then act on a strategy to edit, analyze or trade the strategy. StrategySEEK facilitates entering a forecast via a price chart in one of several forms, including the underlying going to a particular price by a particular future date, the underlying being in a price range on a particular future date and the underlying being outside of a price range on a particular future date. The chart enhances input of the forecast parameters by displaying a range of future dates overlaid with probability bands that express the probability of the underlying being in each band. The future portion of the chart is juxtaposed to a price history which allows the trader to visualize trends and patterns and draw lines reflecting those trends or patterns. The forecast also allows the trader to input an implied volatility forecast. Forecast parameters can be entered with just a few clicks and can be tuned using a set of controls juxtaposed to a price chart, making forecast entry simple but exact. Risk priorities are also part of the forecast and can be selected from a list and then arranged in order of most critical to least critical. With the click of a button the system generates a list of strategies for the user to choose from. If the user has an existing position in the selected underlying security they are given the option to include that position in determining what trade to make that will result in the strategy they have selected. If they have multiple strategies the system displays a dialog for the user to choose which strategy to make the starting strategy. The adjustment trade that will change the starting strategy into the selected strategy is displayed.

In some embodiments, StrategySEEK is executed by first clicking a quote or a position strategy to get an Action Menu then on the menu clicking the button for "Strategy." The StrategySEEK dialog will appear and the user may enter a forecast and display strategies related to the forecast. The user may then select a strategy and take actions on the strategy including editing the strategy, analyzing the strategy and trading the strategy.

FIG. 1 is a screen shot illustrating an embodiment of the StrategySEEK module. In the example shown, StrategySEEK is used to specify a forecast and a set of risk priorities and display related strategies including option strategies such that actions can be taken on the strategies such as analyzing a strategy, editing a strategy or placing an order for a strategy. Window 100 comprises' the display for the whole module shown in a state where no strategies have been generated. Tab 101 enables a user to access the Quote screen for the underlying. Tab 102 enables a user to access the chart screen for the underlying. Tab 103 enables a user to access the option chain for the underlying. Tab 104, which is selected in the diagram, enables a user to access the StrategySEEK module for the underlying. Value 105 is the Bid for the underlying. Value 106 is the Ask for the underlying. Value 107 is the Bid Size and Ask Size associated with the Bid and Ask values. Value 108 is the Volume for the underlying. Symbol 109 is the underlying symbol, which the user can change by typing it or using a drop down to select a new symbol. Expander icon 110 is used to get more detailed quote information on the underlying. Color indicator 111 uses color to convey how much the underlying is up or down on the day. Value 112 is the Last trade value for the underlying. Value 113 is the Mark Change for the day for the underlying. Value 114 is the Mark % Change for the day for the underlying. Component 115 is the Forecast component of the StrategySEEK module. This component is where the user enters a forecast for the underlying security which will be used as an input for determining strategies. In some embodiments, the details of the input mechanism correspond to the details described in FIG. 2A. Component 116 is the Risk Priorities component of the StrategySEEK module. This component is where the user enters the risk priorities which will be used as inputs to determine strategies. In some embodiments, the details of inputting risk priorities correspond to the details described in FIG. 3. Component 117 is the Strategy component of the StrategySEEK module. This component is where the strategies will be displayed that match the user's forecast and desired priorities. In various embodiments, the details of strategy display correspond to the details shown in FIGS. 4 and 5A; FIG. 5A shows the state of this component after strategies have been generated and are displayed in the component.

Figure 2A:
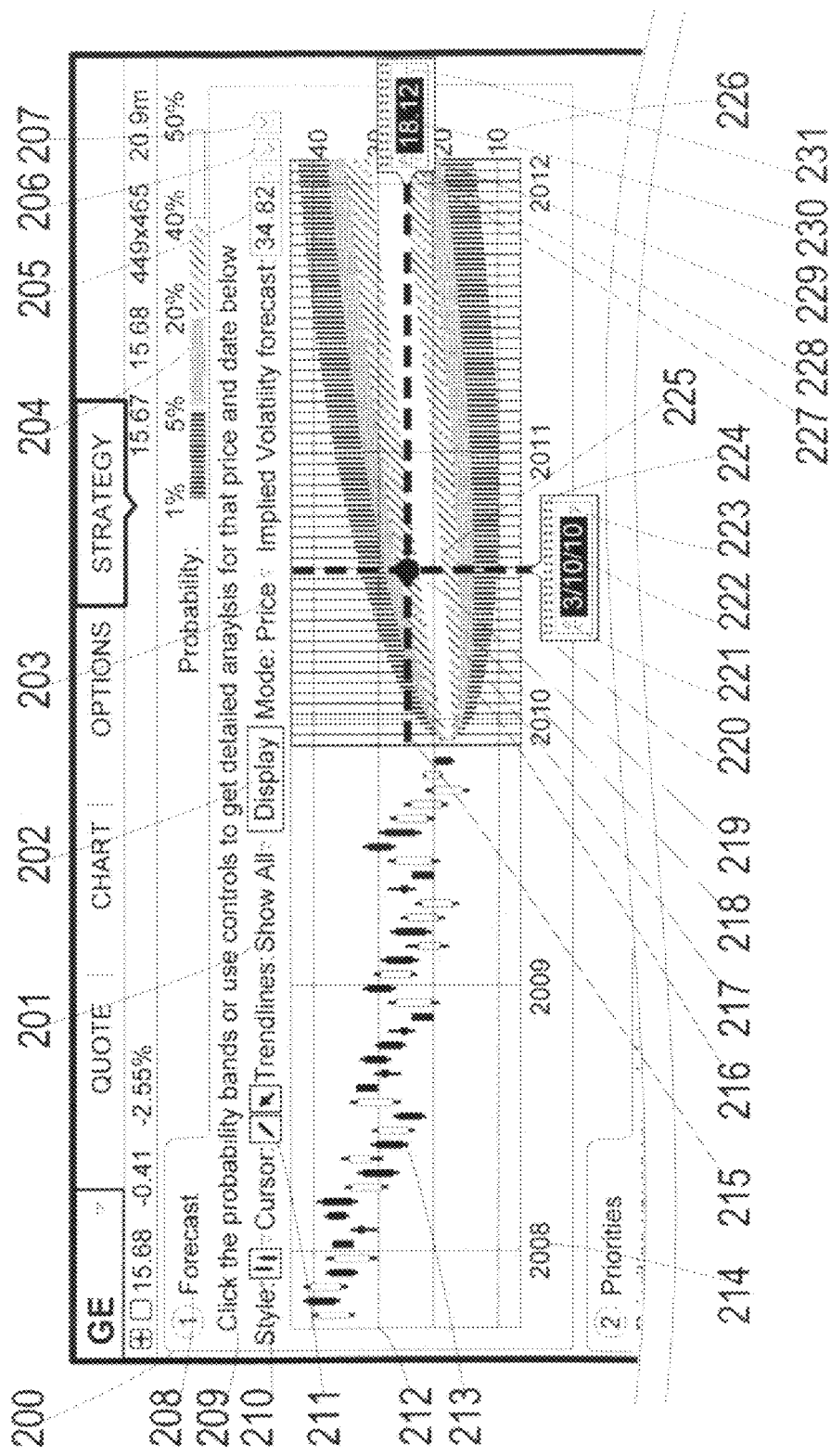
FIG. 2A is a screen shot illustrating an embodiment of the Forecast component of the StrategySEEK module showing a "Price" type of forecast.

FIG. 2A is a screen shot illustrating an embodiment of the Forecast component of the StrategySEEK module showing a "Price" type of forecast. In the example shown, drop down 201 is used to display trendlines on the chart. Button 202 enables a user to invoke a dialog to display overlays such as earnings announcement dates on the chart. Drop down 203 enables a user to specify the type of forecast the user wishes to make, including a price forecast where the user predicts the underlying will reach a particular price, a range forecast where the user predicts the underlying will stay within a price range and an out-of-range forecast where the user predicts a range the underlying will not end up in. Legend 204 is the legend of a color coding scheme for creating colored probability bands for the future area of the chart that show visually the probability of the underlying being in certain price areas on certain dates. Drop down 205 enables the user to select or enter an implied volatility as part of the forecast. Button 206 allows the user to increase the vertical scale of the chart. Button 207 allows the user to decrease the time span of the chart. Title 208 is the title of the component. Text 209 comprises instructions for the user for specifying forecast parameters. Drop down 210 enables a user to change the chart style. The cursors in 211 enables a user to draw and select trendlines on the chart. Marker 212 comprises the price chart, which includes a price history juxtaposed to a range of future dates with probability bands displayed where the bands indicate using color the probability the underlying will be in particular price and time areas. Marker 213 indicates the display of price data, in this example the style is a candle chart. Scale 214 indicates the time frame on the horizontal axis. Line 215 indicates the price of the user's forecast. Probability band 216 indicates the area where the underlying has a 1% to 5% chance of ending up. Probability band 217 indicates the area where the underlying has a 5% to 20% chance of ending up. Probability band 218 indicates the area where the underlying has a 20% to 40% chance of ending up. Probability band 219 indicates the area where the underlying has a 40% to 50% chance of ending up. Control 220 enables a user to adjust the date selection. Spinner 221 enables a user to make small adjustments to the date selection. Field 222 displays the selected date and can be edited. Drop down 223 allows the user to select from popular dates for the forecast. Tactile area 224 allows the user to grab and drag the control using the mouse to adjust the date. Line 225 indicates the date of the user's forecast. Scale 226 indicates the price scale of the chart. Control 227 enables a user to adjust the price selection. Tactile area 228 allows the user to grab and drag the control using the mouse to adjust the date. Spinner 229 enables a user to make small adjustments to the price selection. Field 230 displays the selected date and can be edited. Drop down 231 allows the user to select from popular dates for the forecast.

Figure 2B:
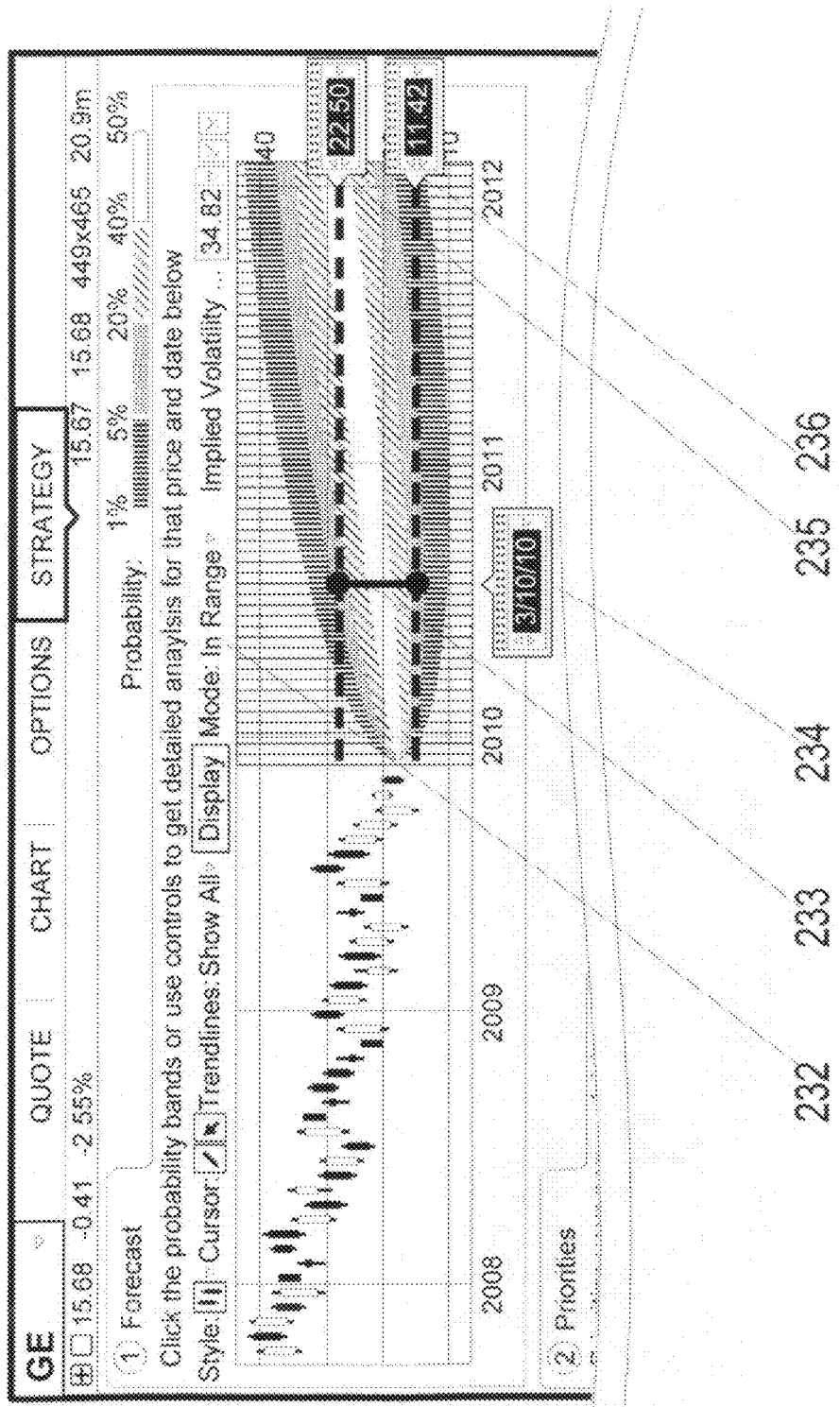
FIG. 2B is a screen shot illustrating an embodiment of the Forecast component of the StrategySEEK module showing an "In Range" type of forecast.

FIG. 2B is a screen shot illustrating an embodiment of the Forecast component of the StrategySEEK module showing an "In Range" type of forecast. In the example shown, drop down 232 displays the forecast type, which is "In Range". Bar 233 displays visually the price range of the forecast on the chart. Control 234 enables a user to specify the date for the forecast. Control 235 enables a user to specify the upper bound of the price of the forecast. Control 236 enables a user to specify the lower bound of the price of the forecast.

Figure 2C:
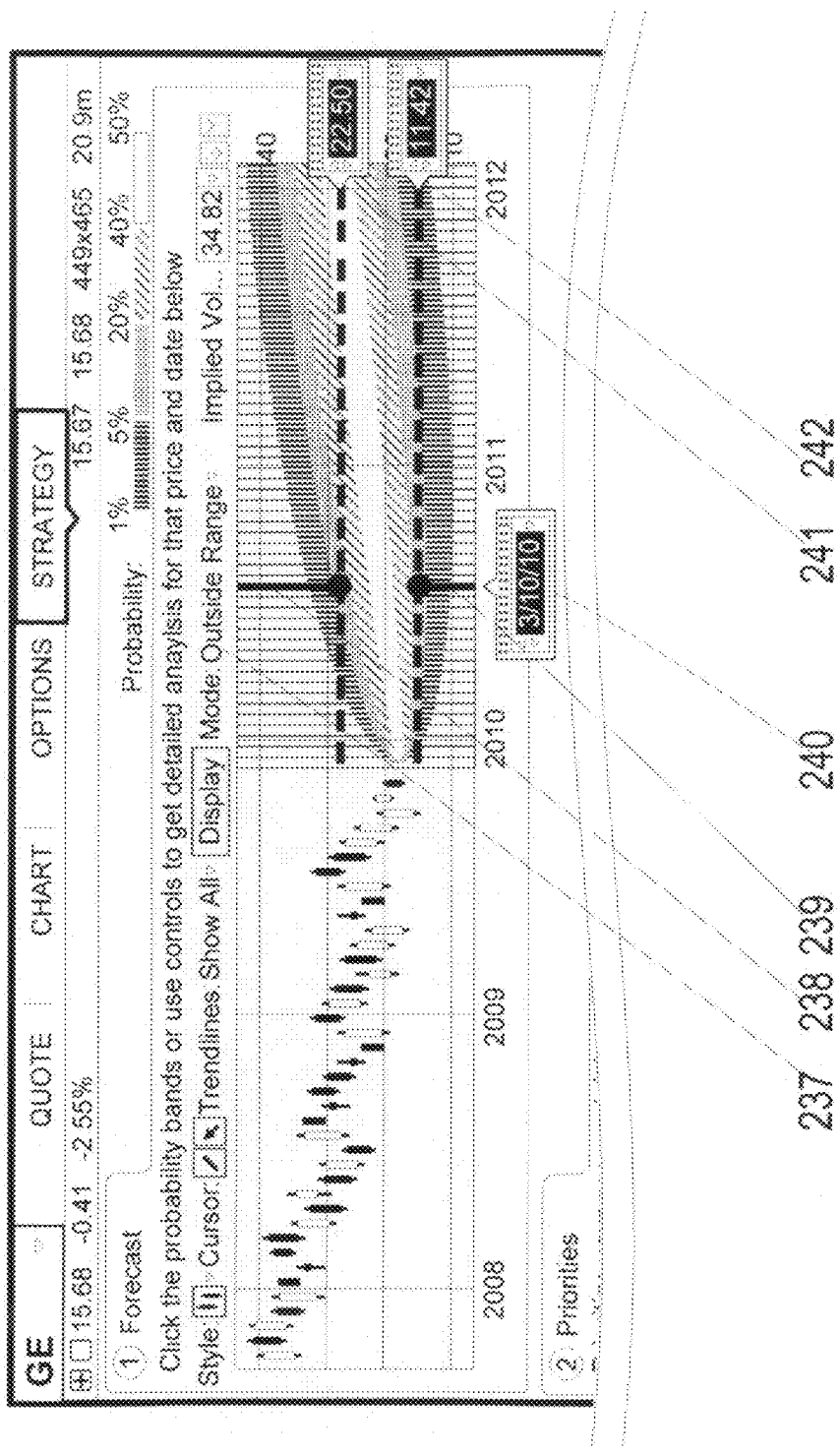
FIG. 2C is a screen shot illustrating an embodiment of the Forecast component of the StrategySEEK module showing an "Outside Range" type of forecast.

FIG. 2C is a screen shot illustrating an embodiment of the Forecast component of the StrategySEEK module showing an "Outside Range" type of forecast. In the example shown, drop down 237 displays the forecast type, which is "Outside Range". Bar 238 displays visually the upper area of the price forecast on the chart. Bar 239 displays visually the lower area of the price forecast on the chart. Control 240 enables a user to specify the date for the forecast. Control 241 enables a user to specify the upper area of the price forecast. Control 242 enables a user to specify the lower area of the price forecast.

Figure 3:
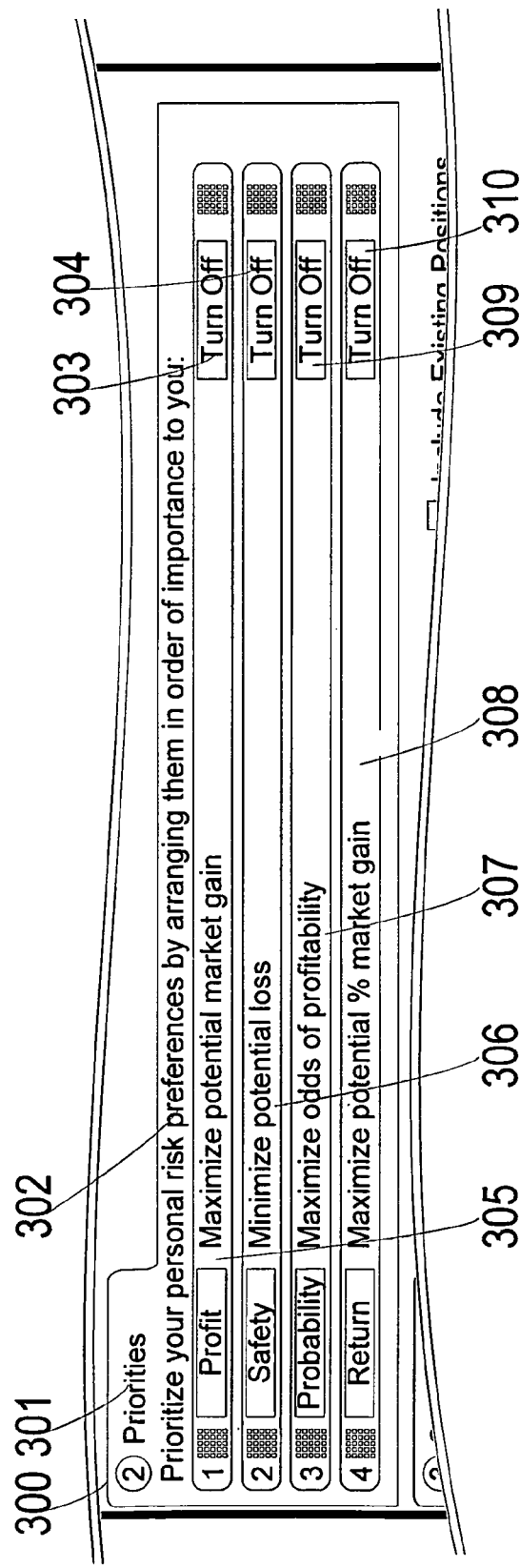
FIG. 3 is a screen shot illustrating an embodiment of the Risk Priorities component of the StrategySEEK module.

FIG. 3 is a screen shot illustrating an embodiment of the Risk Priorities component of the StrategySEEK module. In the example shown, window 300 comprises the display for the whole Risk Priorities component. Text 301 indicates the title "Priorities" of the component. Text 302 comprise instructions for the user to arrange the risk preferences in the desired order. Button 303 allows the user to toggle on and off the "Profit" risk priority. Button 304 allows the user to toggle on and off the "Safety" risk priority. Bar 305 represents the "Profit" risk priority and can be repositioned relative to the other bars (see Markers 306, 307, 308). Bar 306 represents the "Safety" risk priority and can be repositioned relative to the other bars (see Markers 305, 307, 308). Bar 307 represents the "Probability" risk priority and can be repositioned relative to the other bars (see Markers 305, 306, 308). Bar 308 represents the "Return" risk priority and can be repositioned relative to the other bars (see Markers 305, 306, 307). Button 309 allows the user to toggle on and off the "Probability" risk priority. Button 310 allows the user to toggle on and off the "Return" risk priority.

Figure 4:
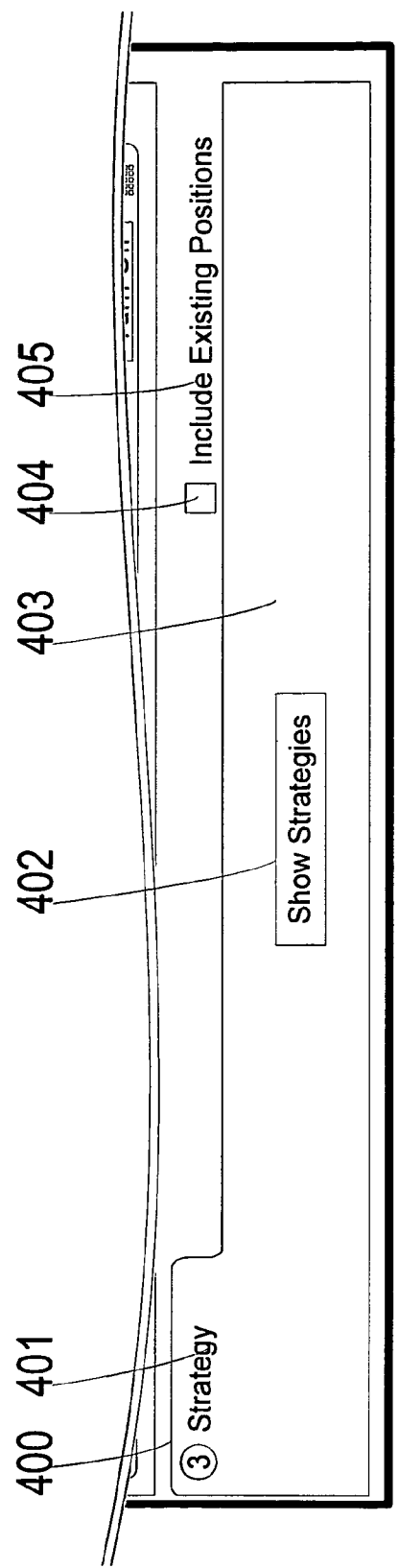
FIG. 4 is a screen shot illustrating an embodiment of the Strategy component of the StrategySEEK module before strategies are generated and displayed.
Figure 5A:
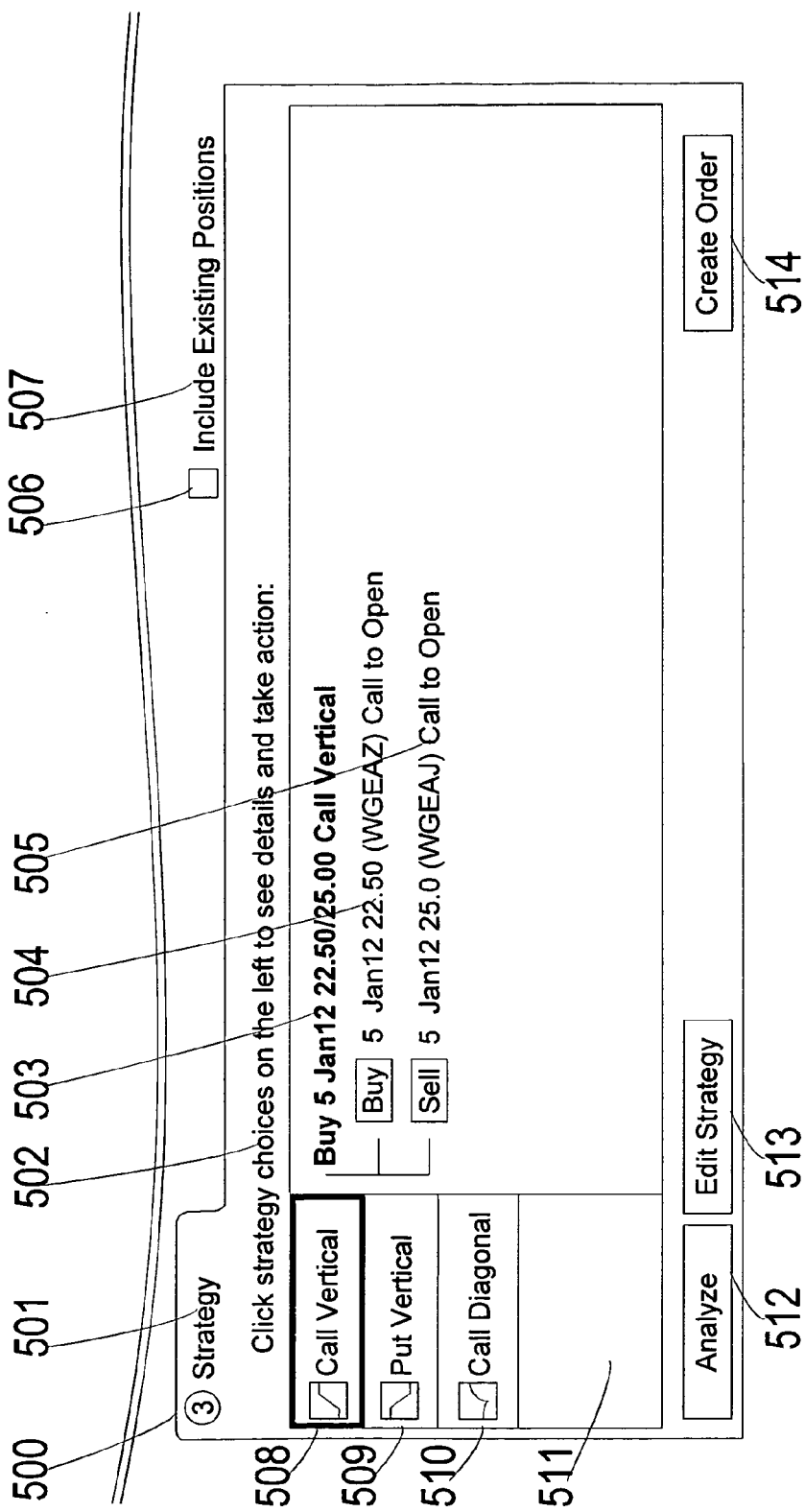
FIG. 5A is a screen shot illustrating an embodiment of the Strategy component of the StrategySEEK module after strategies are generated and displayed.

FIG. 4 is a screen shot illustrating an embodiment of the Strategy component of the StrategySEEK module before strategies are generated and displayed. In the example shown, Marker 400 indicates the display for the entire Strategy component. Text 401 is the title of the component. Button 402 comprises a button that enables a user to generate and display strategies based on the entered forecast and risk priorities. Box 403 is the area the strategies will display in. Check box 404 enables the user to include the legs or component instruments of an existing position as part of the legs needed to get to the net suggested strategy. Text 405 is the explanatory text for the check box control.

FIG. 5A is a screen shot illustrating an embodiment of the Strategy component of the StrategySEEK module after strategies are generated and displayed. In the example shown, marker 500 indicates the entire Strategy component. Text 501 is the title of the component. Text 502 is the instruction line for the user as to how to view strategies. Strategy 503 is the detailed description of the strategy that is selected in the list of strategies. The description indicates a "Buy" order where the quantity is "5" and the expiration is "Jan 12" or January of 2012 and the strike prices are "22.5" and "25.0" and the type of strategy is a "Call Vertical" strategy. Markers 504 and 505 indicate the legs or component instruments of the strategy. Description 504 indicates a "Buy" order where the quantity is "5" and the expiration is "Jan 12" or January of 2012 and the strike price is "22.5" and the option symbol is "WGEAZ" and the type of option is a "Call" and the "to Open" indicates an opening transaction. Description 505 indicates a "Sell" order where the quantity is "5" and the expiration is "Jan 12" or January of 2012 and the strike price is "25.0" and the option symbol is "WGEAJ" and the type of option is a "Call" and the "to Open" indicates an opening transaction. Check box 506 enables the user to include the legs or component instruments of an existing position as part of the legs needed to get to the net suggested strategy. Text 507 is the explanatory text for the check box control. Strategies 508, 509 and 510 are the strategies generated by the StrategySEEK module for this example. In various embodiments, strategies are generated using a table look up, using an algorithm, using risk priorities, using a forecast, using a volatility, using a model, or any other appropriate manner of generating a strategy. Strategy 508 is currently selected with its details shown in Markers 503, 504 and 505. Area 511 is the area for displaying the list of generated strategies. Buttons 512, 513 and 514 enable the user to take action on the selected strategy, which for this example is the "Call Vertical" shown in Marker 508. Button 512 enables the user to navigate to a tool for analyzing the strategy. Button 513 enables the user to edit the strategy. Button 514 enables the user to place an order for the strategy.

Figure 5B:
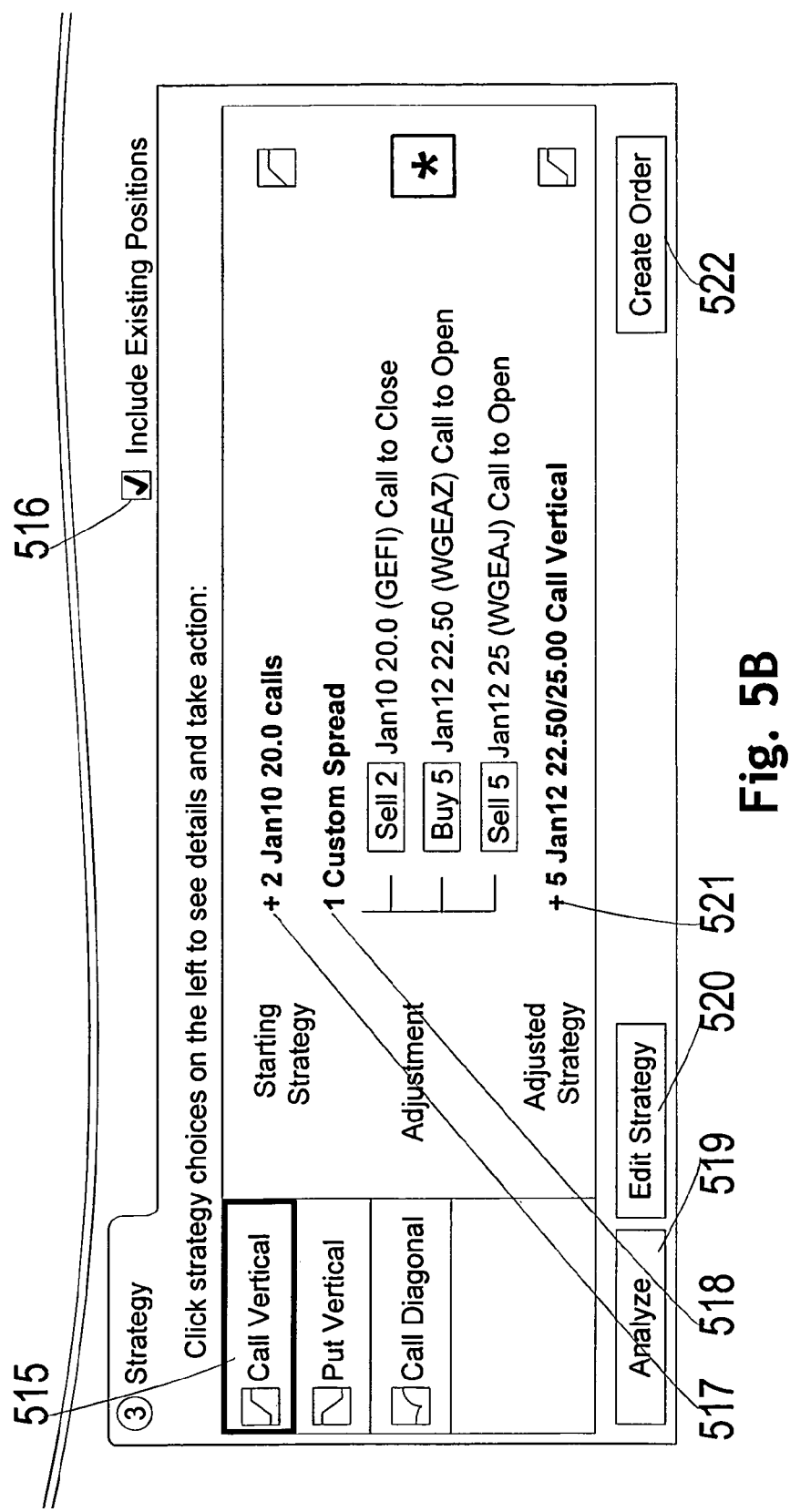
FIG. 5B is a screen shot illustrating an embodiment of the Strategy component of the StrategySEEK module after strategies are generated and displayed and the user has elected to include an existing position.

FIG. 5B is a screen shot illustrating an embodiment of the Strategy component of the StrategySEEK module after strategies are generated and displayed and the user has elected to include an existing position. In the example shown, marker 515 indicates the selected strategy, a Call Vertical. Check box 516 has been selected by the user in order to include an existing position to achieve the net set of legs in the selected strategy, which is a Call Vertical. Marker 517 indicates the Starting Strategy which is the held position. The starting strategy is a long call position with quantity "+2" and expiration "Jan 10" and strike price "20.0" and the type of option is a "call" option. Marker 518 indicates the Adjustment which is the trade needed to go from the held position or Starting Strategy to the selected Call Vertical strategy which will be the Adjusted Strategy once the trade is made. The Adjustment is a Custom Spread consisting of three legs. The first leg is selling 2 Jan. 2010 20.0 strike calls which will close the current position. The next two legs are the purchase of the Call Vertical, which consists of buying the January 2012 22.5 strike call (quantity 5) and selling the January 2012 25.0 strike call (quantity 5). Button 519 enables a user to to analyze the Adjustment trade. Button 520 enables a user to edit the Adjustment trade. Marker 521 indicates the Adjusted Strategy which will result once the Adjustment trade fills. The Adjusted Strategy is the January 2012 Call Vertical with strike prices 22.5 and 25.0 which was the strategy the user selected from the list of generated strategies (see FIG. 5A, Marker 503). Button 522 is for creating the order for the Adjustment trade.

Figure 5C:
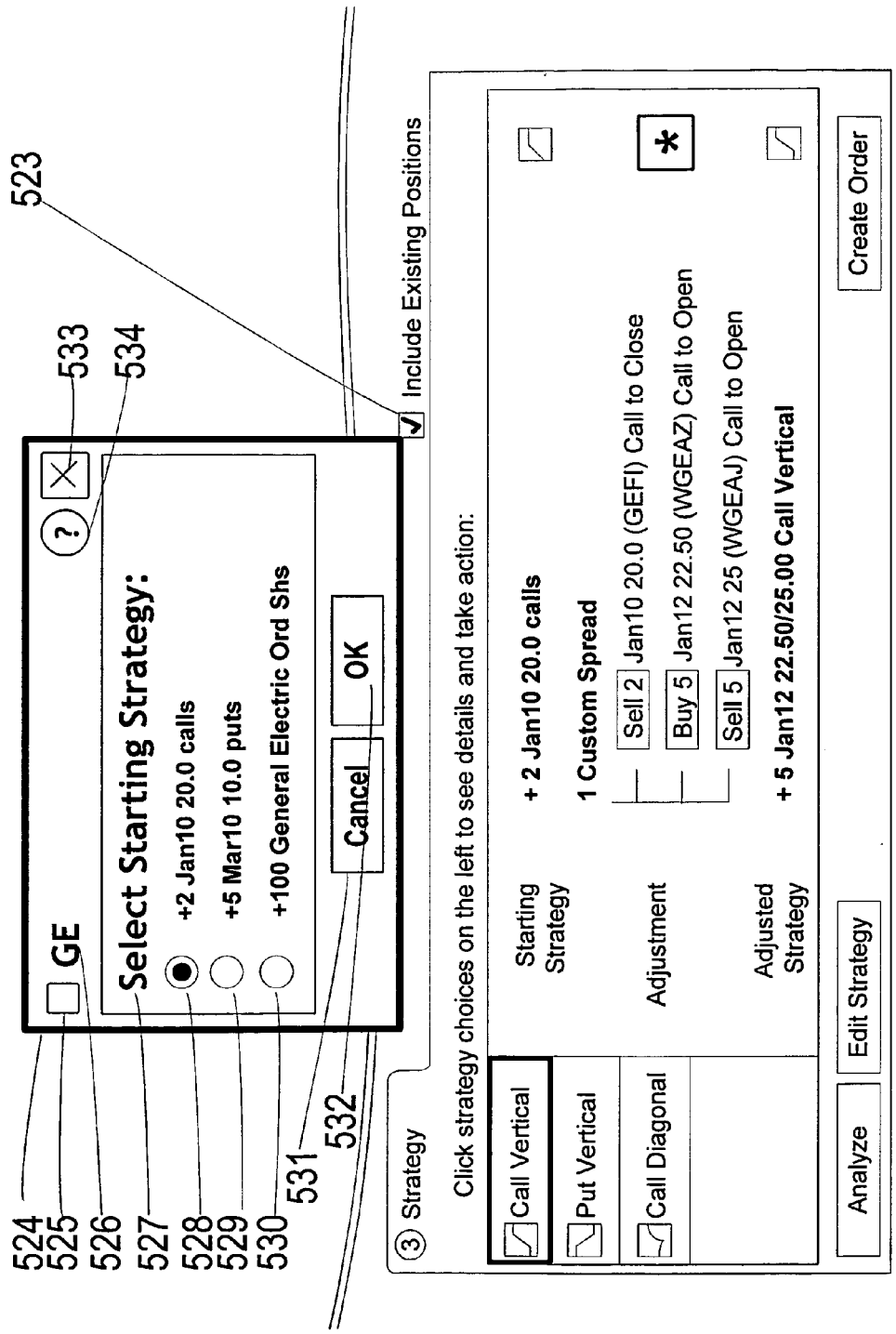
FIG. 5C is a screen shot illustrating an embodiment of the Strategy component of the StrategySEEK module after strategies are generated and displayed and the user has elected to include an existing position.

FIG. 5C is a screen shot illustrating an embodiment of the Strategy component of the StrategySEEK module after strategies are generated and displayed and the user has elected to include an existing position. In the example shown, the user can choose via dialog 524 from several existing positions. Check box 523, has been selected by the user in order to include an existing position to achieve the net set of legs in the selected strategy which is a Call Vertical. Dialog 524 displays in the event that the user has more than one existing position. Color indicator 525 shows whether the underlying is up or down on the day. Symbol 526 is the underlying symbol. Instruction 527 tells the user to select the desired Starting Strategy. Radio button 528 shows the selected existing position to use as the Starting Strategy. Radio buttons 529 and 530 show other existing positions that could be chosen instead of the position in 528. Button 531 enables a user to cancel the dialog with no action being taken. Button 532 enables a user to confirm the user's selection to include an existing position. Button 533 enables a user to close the dialog without taking action. Button 534 enables a user to accessing help related to this dialog.

Figure 6:
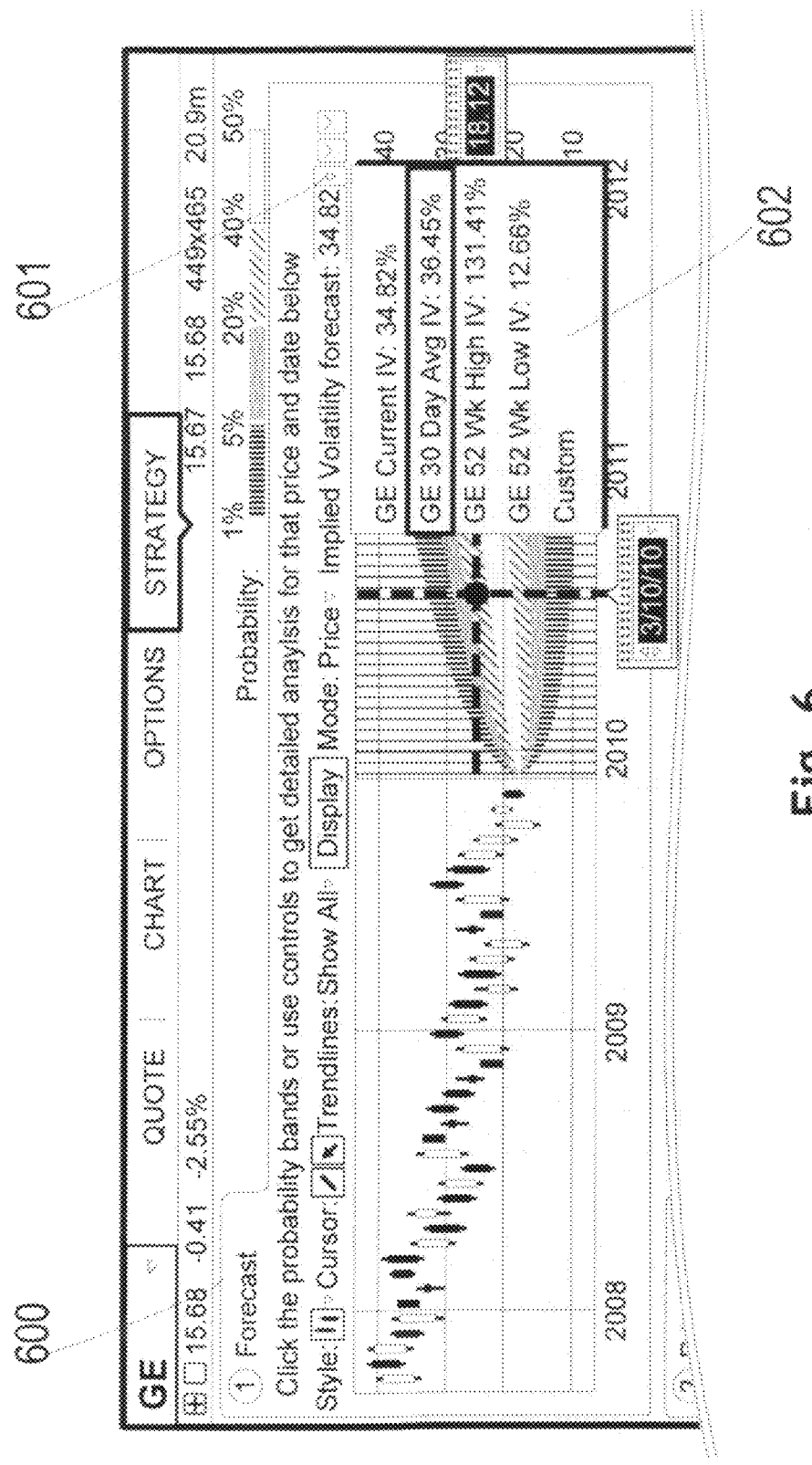
FIG. 6 is a screen shot illustrating an embodiment of a drop down menu for changing the implied volatility used in a forecast.

FIG. 6 is a screen shot illustrating an embodiment of a drop down menu for changing the implied volatility used in a forecast. In the example shown, marker 600 indicates the Forecast component of the StrategySEEK module. Marker 601 indicates the drop down enabling a user to specify an implied volatility for the user's forecast. Marker 602 indicates the contents of the drop down which include a set of popular implied volatility values as well as the capability for the user to enter a custom value.

Figure 7:
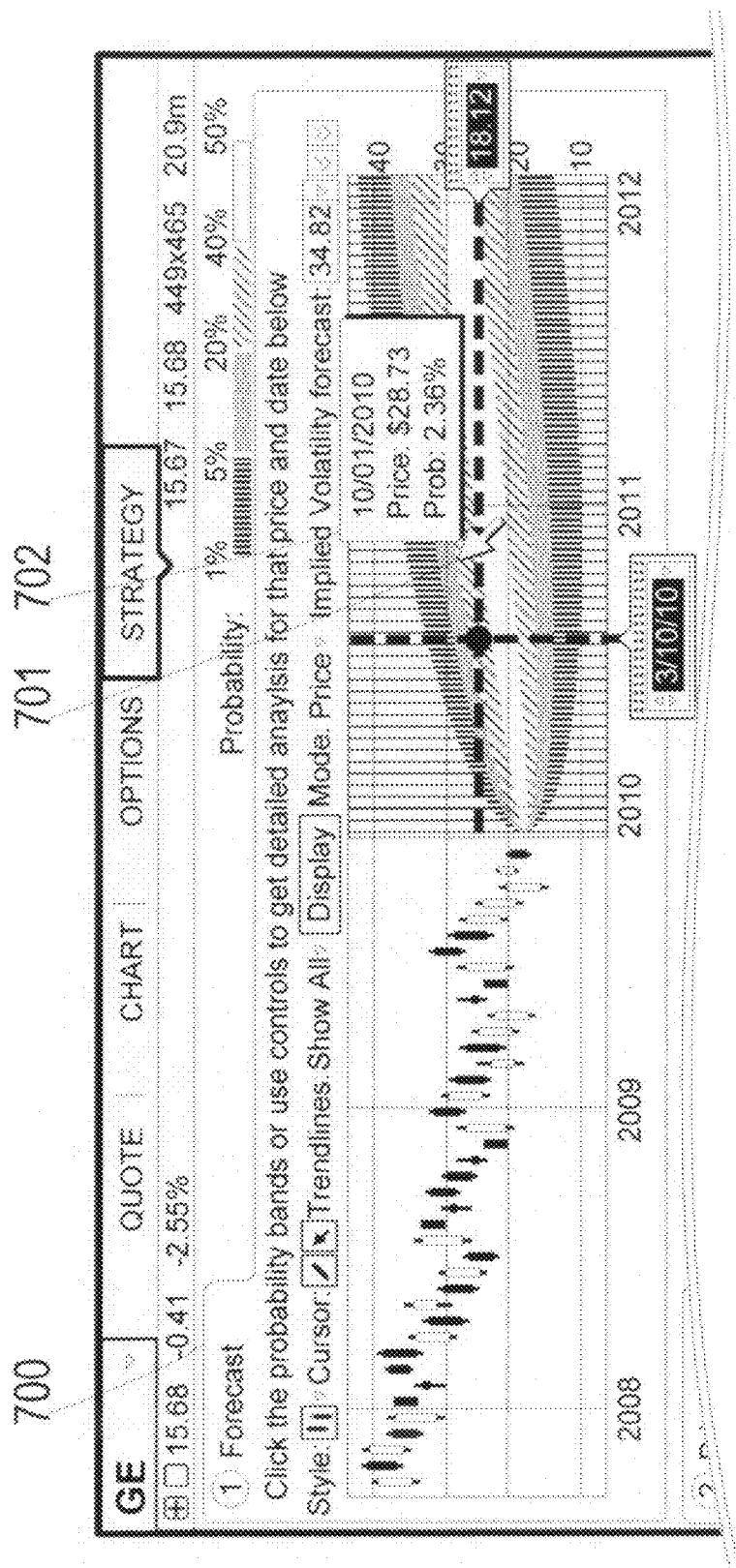
FIG. 7 is a screen shot illustrating an embodiment of a tool tip that displays when the user rolls over a point in future time on the chart.

FIG. 7 is a screen shot illustrating an embodiment of a rollover tool tip for indicating the probability of the underlying security being above or below a certain price. In the example shown, marker 700 indicates the Forecast component of the StrategySEEK module. Marker 701 indicates the user's cursor rolling over a future point in time on the price chart. Mapped onto the future points in time are probability bands which represent a range of percentages that the underlying price will end up at that level on that date. Marker 702 indicates the contents of the tool tip which for this example show the user's cursor is at the point on the chart for the date of 10/01/201 and an underlying price of 28.73. The probability shown of the underlying security being at 28.73 or above 28.73 on the date Oct. 1, 2010 is 2.36%. Should the user's cursor be below the current underlying price on the chart, the probability displayed is interpreted as "at or below" the current price.

Figure 8:
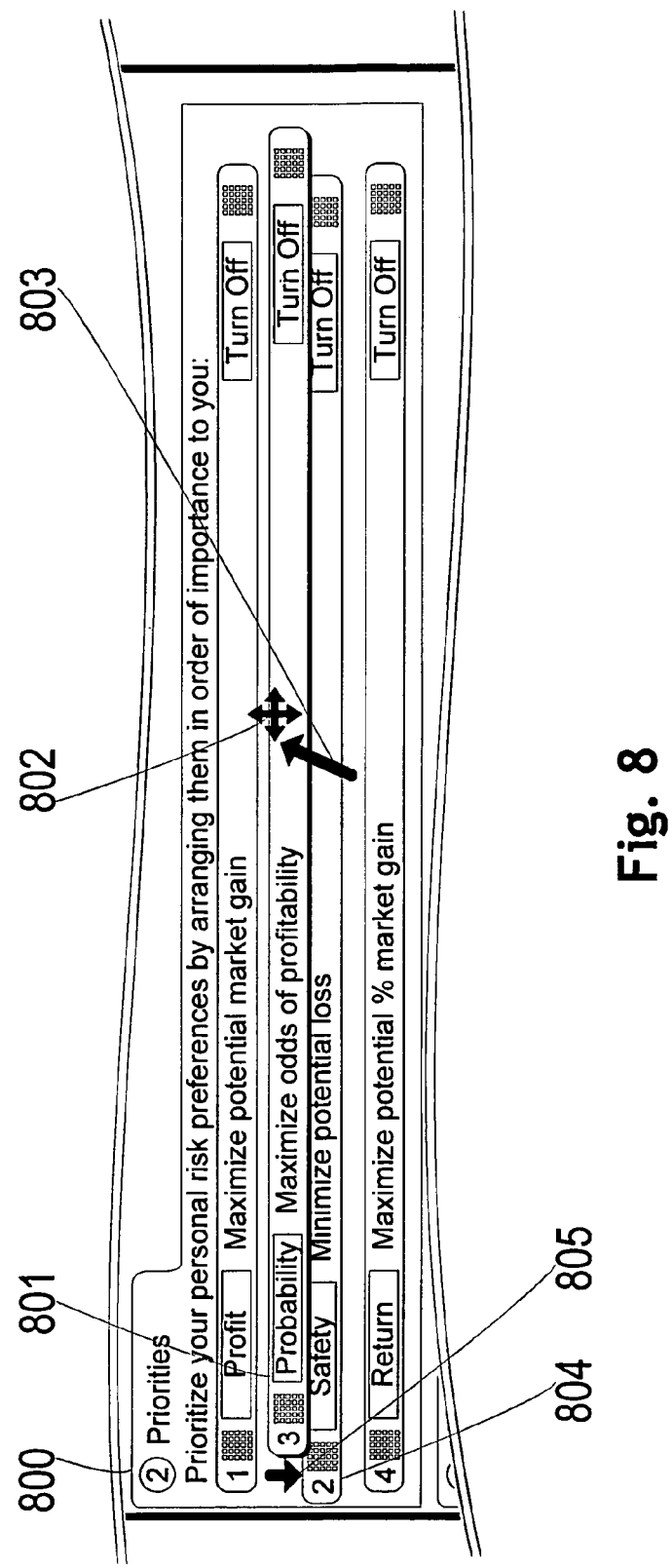
FIG. 8 is a screen shot illustrating an embodiment of the Risk Priorities component of the StrategySEEK module where the user is adjusting the order of the priorities.

FIG. 8 is a screen shot illustrating an embodiment of the Risk Priorities component of the StrategySEEK module where the user is adjusting the order of the priorities. In the example shown, marker 800 indicates the Risk Priorities component of the StrategySEEK module. Marker 801 indicates a bar that represents the "Probability" risk factor which is being moved from priority number 3 to priority number 2. Cursor 802 enables a user to move the priority bars. Arrow 803 indicates the upward motion of the cursor, moving the "Probability" bar upward in rank order. Bar 804 is the bar that represents the "Safety" risk factor which is automatically moving downward as indicated by arrow 805 as the user moves the "Probability" bar upward.

Figure 9:
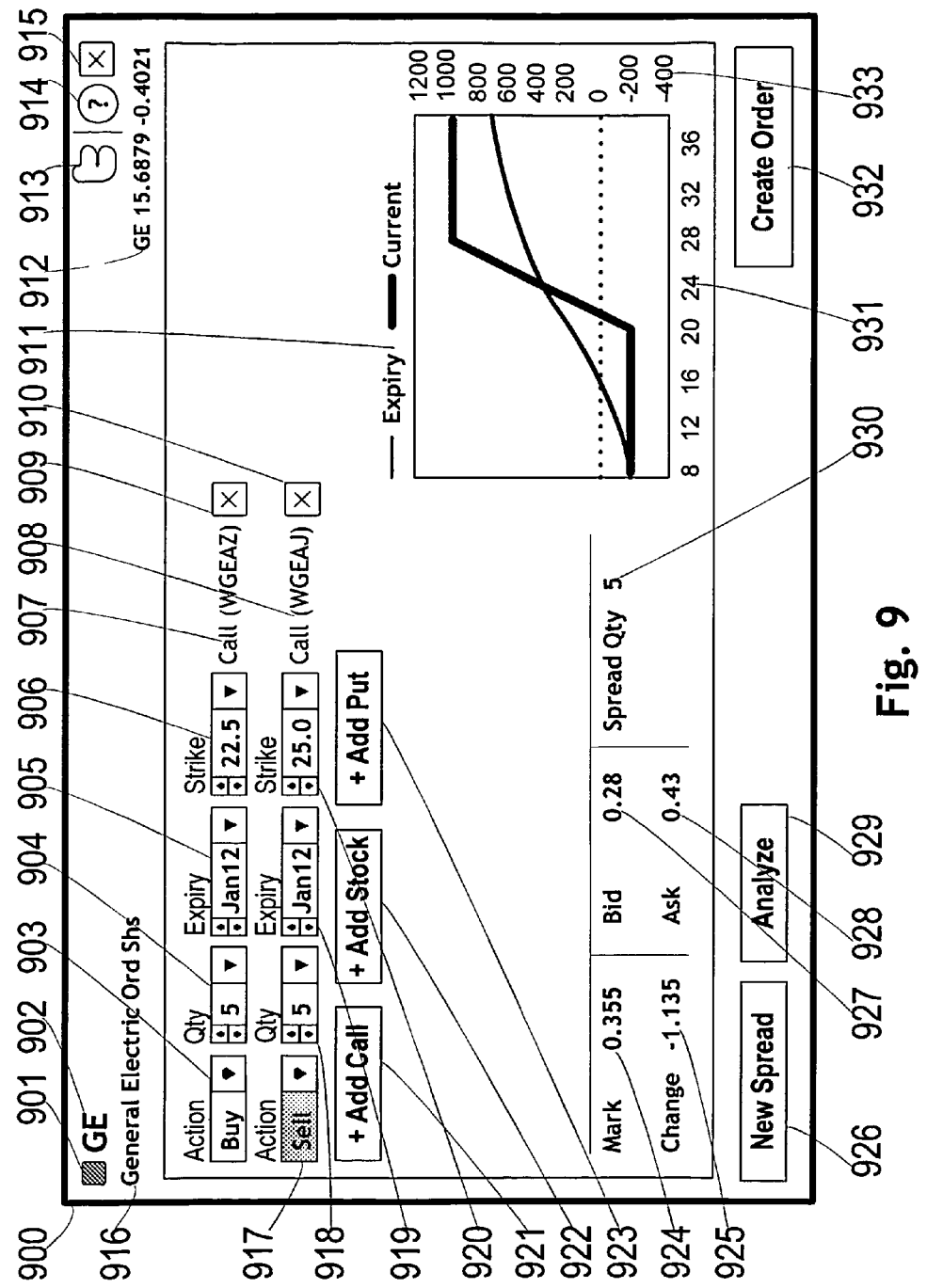
FIG. 9 is a screen shot illustrating an embodiment of a strategy editing tool invoked from a strategy generated by and displayed in the StrategySEEK module.

FIG. 9 is a screen shot illustrating an embodiment of a strategy editing tool invoked from a strategy generated by and displayed in the StrategySEEK module. For example, the user could click button 513 in FIG. 5A to invoke the dialog in FIG. 9. In the example shown, marker 900 indicates the strategy editing dialog. Color indicator 901 shows how much the underlying is up or down on the day. Symbol 902 is the underlying symbol for the strategy. Action 903 is the Buy or Sell action for the first leg of the strategy. Field 904 holds the quantity for the first leg. Drop down 905 selects the expiration of the first leg. Drop down 906 selects the strike price of the first leg. Text 907 is the option symbol for the first leg. Text 908 is the option symbol for the second leg. Icon 909 enables a user to remove the first leg by clicking on icon 909. Icon 910 enables a user to remove the second leg by clicking on icon 910. There can be up to four legs, the example shown has two. Legend 911 is the legend for the risk profile chart, which plots strategy values vs. underlying values for the current time and for expiration. Quote 912 is a current quote for the underlying. Icon 913 enables a user to share information on this strategy on the social networking site Twitter. Icon 914 is to access help for this dialog. Icon 915 enables a user to close the window without taking any action. Text 916 is the name of the underlying. Action 917 is the Buy or Sell action for the second leg of the strategy. Field 918 holds the quantity for the second leg. Drop down 919 enables a user to select the expiration of the second leg. Drop down 920 enables a user to select the strike price of the second leg. Button 921 enables a user to add a call as an additional leg to the strategy. Button 922 enables a user to add stock as an additional leg to the strategy. Button 923 enables a user to add a put as an additional leg to the strategy. Text-value pair 924 displays the mark price of the strategy. Text-value pair 925 displays the change in price of the strategy from the prior close. Button 926 enables the user to abandon the spread in this dialog and select a new type of spread. Text-value pair 927 is the current Bid of the strategy. Text-value pair 928 is the current Ask of the strategy. Button 929 invokes the Analysis tools which enable the user to analyze the strategy. Text-value pair 930 is the quantity of the spread. Scale 931 is the series of underlying prices on the horizontal axis of the risk profile chart. Button 932 allows the user to create an order for the strategy. Scale 933 shows values of the strategy on the vertical axis of the risk profile chart.

Figure 10:
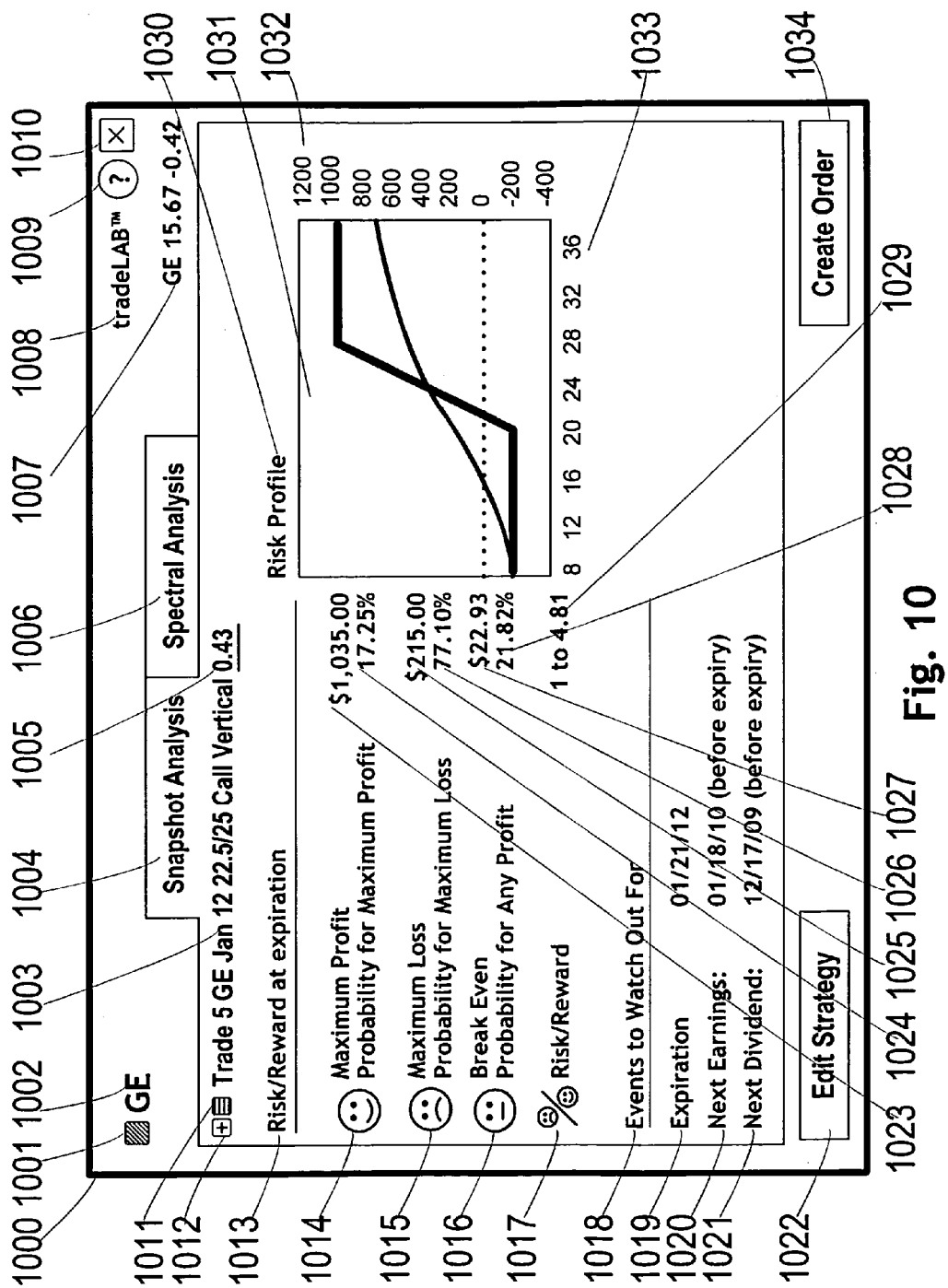
FIG. 10 is a screen shot illustrating an embodiment of a strategy analysis tool.

FIG. 10 is a screen shot illustrating an embodiment of the Analysis module. In some embodiments, the user invokes the analysis module from a strategy displayed in the Strategy-SEEK module (e.g., by clicking button 512 in FIG. 5A). Marker 1000 indicates the Analysis module. Indicator 1001 is a color indicator which represents how much the underlying is up or down on the day. Symbol 1002 is the underlying symbol for the strategy being analyzed. Description 1003 indicates a "Trade" where the quantity is "5" and the underlying symbol is "GE" and the expiration is "Jan 12" or January of 2012 and the strike prices are "22.5" and "25:0" and the type of strategy is a "Call Vertical" and the mark price is "0.43". Tab 1004 displays the Snapshot Analysis screen while tab 1006 displays the Spectral Analysis screen. Quote 1007 is a current quote for the underlying security. Text 1008 indicates the dialog houses a set of tools called tradeLAB™. Icon 1009 enables a user to access help for this module. Icon 1010 enables a userclose the window without taking action. Indicator 1011 is a color indicator that shows how much the strategy is up or down on the day. Expander 1012 allows the user to see the individual legs that make up the strategy. Text 1013 indicates the Risk/Reward parameters. Illustrative icon 1014 indicates the profit information. Illustrative icon 1015 indicates the loss information. Illustrative icon 1016 indicates the break even information. Illustrative icon 1017 indicates the risk/reward ratio. Text 1018 indicates the list of key events. Text-value pair 1019 is the Expiration date of the strategy. Text-value pair 1020 is the date of the Next Earnings announcement. Text-value pair 1021 is the date of the Next Dividend. Button 1022 enables a user to edit the strategy. Text-value pair 1023 shows the Maximum Profit for the strategy. Text-value pair 1024 shows the Probability for Maximum Profit for the strategy. Text-value pair 1025 shows the Maximum Loss for the strategy. Text-value pair 1026 shows the Probability for Maximum Loss for the strategy. Text-value pair 1027 shows the Break Even for the strategy. Text-value pair 1028 shows the Probability for Any Profit for the strategy. Text-value pair 1029 shows the Risk/Reward ratio for the strategy. Text 1030 shows the title for the Risk Profile graph. Chart 1031 is the Risk Profile graph, which maps values of the strategy to values of the underlying at both expiration (heavy line) and for the current time (lighter line). Scale 1032 shows the range of strategy prices on the chart. Scale 1033 show the range of underlying prices on the chart. Button 1034 shows the Create Order button from which the user can create an order for the strategy.

Figure 11:
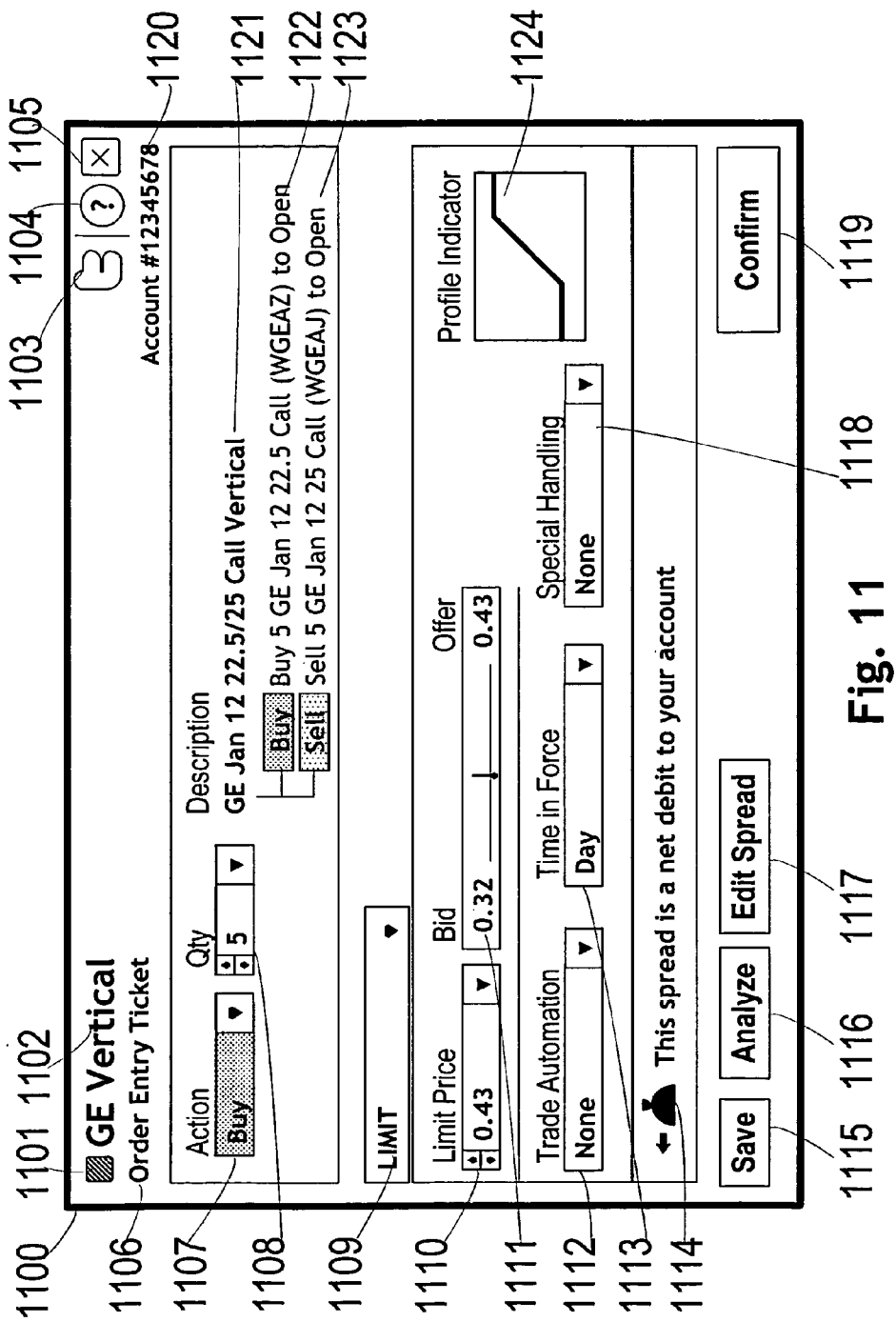
FIG. 11 is a screen shot illustrating an embodiment of an order ticket for placing a trade invoked from a strategy generated by and displayed in the StrategySEEK module.

FIG. 11 is a screen shot illustrating an embodiment of an Order Ticket. In some embodiments, the user invokes an order ticket from a strategy displayed in the StrategySEEK module (e.g., by clicking button 514 in FIG. 5A). In the example shown, marker 1100 indicates the Order Ticket. Indicator 1101 is a color indicator which represents how much the strategy is up or down on the day. Marker 1102 is the name of the strategy, in this example a GE Vertical where GE is the underlying symbol and Vertical is the type of strategy. Icon 1103 enables a user to share information about this strategy on the social networking site Twitter. Icon 1104 enables a user to access help for the Order Ticket. Icon 1105 enables a user to close the window without taking any action. Text 1106 is the title of the Order Ticket. Action 1107 shows the order is to Buy the spread. Field 1108 enables a user to specify the quantity. Selection 1109 indicates the order type which is a "Limit" order. Field 1110 holds the Limit Price. Indicator 1111 displays the Bid-Ask range and where the limit price falls in that range. Drop down 1112 enables a user to elect any desired Trade Automation criteria for the order. Drop down 1113 enables a user to select the Time in Force or how long the order will be good for. Icon and text 1114 tells the user if the spread is a net debit or credit to the account. Button 1115 allows the user to save the order. Button 1116 enables a user to invoke the Analysis tools to analyze the order. Button 1117 enables the user to edit the spread. Drop down 1118 enables the user to select special handling for the order. Button 1119 enables a user to confirm the order so it can be placed. Account number 1120 displays the account the order will be placed in. Strategy 1121 is the detailed description of the strategy that is selected in the list of strategies. The description indicates a "Buy" order where the quantity is "5" and the expiration is "Jan 12" or January of 2012 and the strike prices are "22.5" and "25.0" and the type of strategy is a "Call Vertical" strategy. Markers 1122 and 1123 indicate the legs or component instruments of the strategy. Description 1122 indicates a "Buy" order where the quantity is "5" and the expiration is "Jan 12" or January of 2012 and the strike price is "22.5" and the option symbol is "WGEAZ" and the type of option is a "Call" and the "to Open" indicates an opening transaction. Description 1123 indicates a "Sell" order where the quantity is "5" and the expiration is "Jan 12" or January of 2012 and the strike price is "25.0" and the option symbol is "WGEAJ" and the type of option is a "Call" and the "to Open" indicates an opening transaction. Icon 1124 shows an idealized profile chart of the payoff of the call vertical strategy vs. the price of the underlying security.

Figure 12:
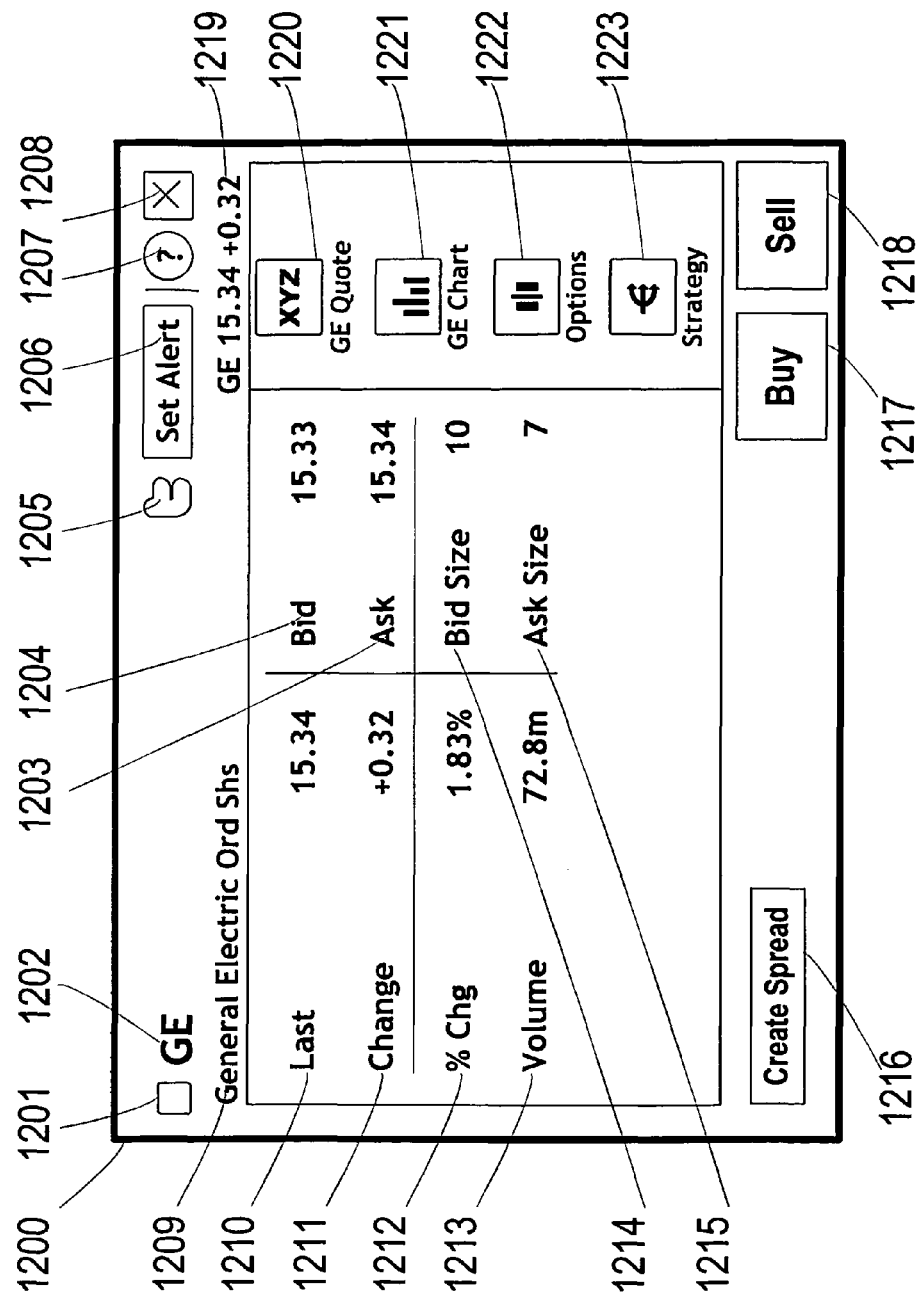
FIG. 12 is a screen shot illustrating an embodiment of an action menu invoked from a quote from which the user can launch the StrategySEEK module.

FIG. 12 is a screen shot illustrating an embodiment of an action menu invoked from a quote from which the user can launch the StrategySEEK module. In the example shown, marker 1200 indicates the Action Menu. Color indicator 1201 shows how much the security is up or down on the day. Symbol 1202 is the security symbol, in the example shown it is the stock symbol for General Electric stock. Text-value pair 1203 is the Ask. Text-value pair 1204 is the Bid. Icon 1205 enables a user to share information about this security via the social networking site Twitter. Button 1206 enables a user to set an alert on the security. Icon 1207 enables a user to access help for this Action Menu. Icon 1208 enables a user to close the window without taking any action. Text 1209 is the description of the security. Text-value pair 1210 is the Last price the security traded at. Text-value pair 1211 is how much the security has changed in price vs. the prior close. Text-value pair 1212 is the price percentage change of the security vs. the prior close. Text-value pair 1213 is the Volume that has traded for the current day. Text-Value pair 1214 is the Bid Size. Text-value pair 1215 is the Ask Size. Button 1216 enables a user to invoke a tool that creates a spread for the security on this Action Menu. Button 1217 enables a user to create an order ticket to Buy the security. Button 1218 enables a user to create an order ticket to Sell the security. Quote 1219 is a current quote for the security. Icon 1220 enables a user to get detailed Quote information on the security. Icon 1221 enables a user to display a Chart for the security. Icon 1222 enables a user to display an Option Chain for the security. Icon 1223 enables a user to launch the StrategySEEK component for the security.

Figure 13:
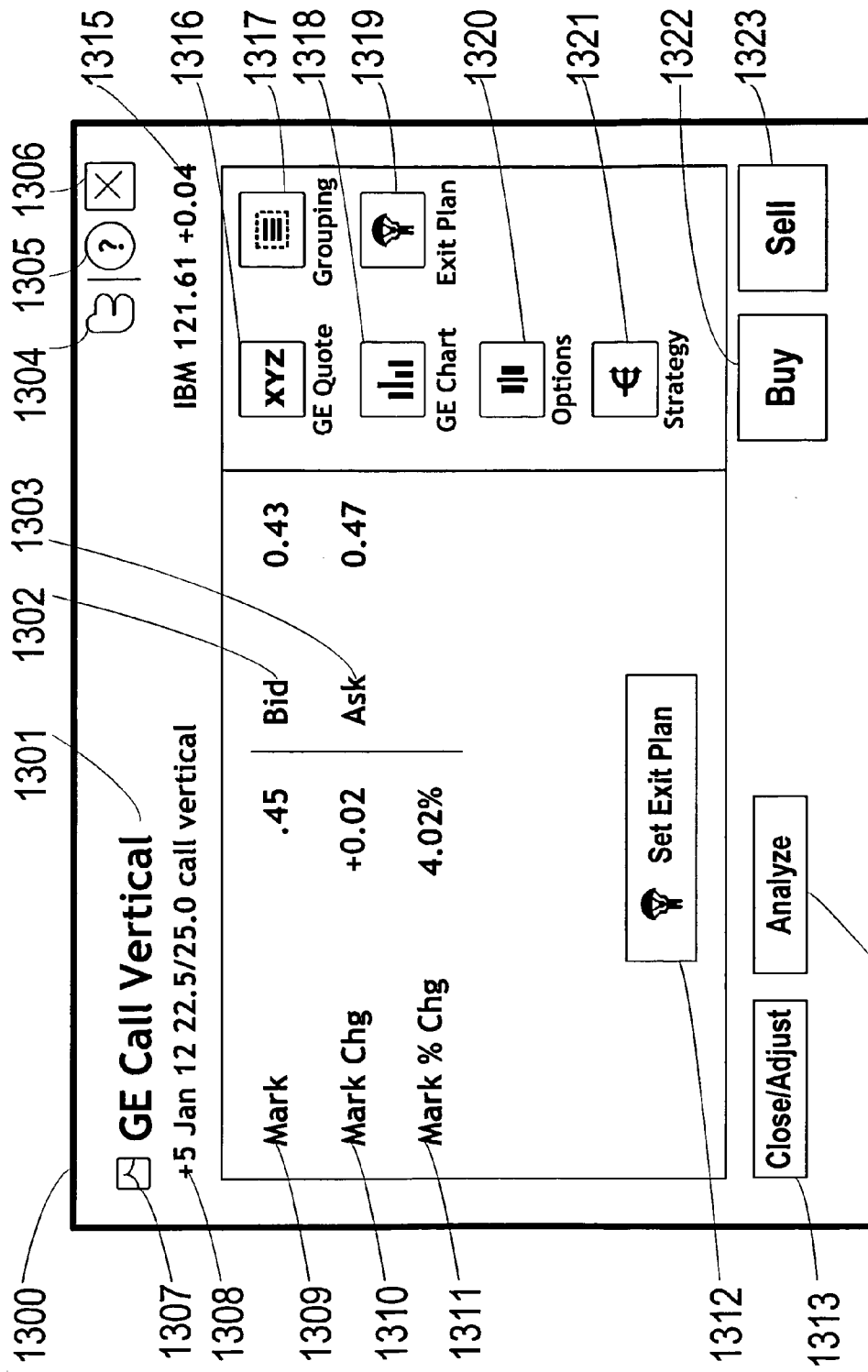
FIG. 13 is a screen shot illustrating an embodiment of an action menu invoked from a position from which the user can launch the StrategySEEK module.

FIG. 13 is a screen shot illustrating an embodiment of an action menu invoked from a position from which the user can launch the StrategySEEK module. In the example shown, marker 1300 indicates the Action Menu. Text 1301 is the position description: a Call Vertical for General Electric. Text-value pair 1302 is the Bid. Text-value pair 1303 is the Ask. Icon 1304 enables a user to share information about this security via the social networking site Twitter. Icon 1305 enables a user to access help for this Action Menu. Icon 1306 enables a uses to close the window without taking any action. Color indicator 1307 shows how much the security is up or down on the day. Text 1308 is the description of the position where "+5" is the quantity, "Jan 12" is the expiration date, "22.5/25.0" are the strike prices" and "Call Vertical" is the type of strategy. Text-value pair 1309 is the Mark price of the position. Text-value pair 1310 is how much the mark price has changed vs. the prior close. Text-value pair 1311 is the percentage change in the mark price. Button 1312 enables a user to set an exit plan for the position. Button 1313 enables a user to close or make an adjustment to the position. Button 1314 enables a user to invoke the Analysis tools for analyzing the position. Quote 1315 is a current quote for the underlying security for the position. Icon 1316 enables a user to get detailed Quote information on underlying for the position. Icon 1317 enables a user to change the grouping of legs held for the underlying. Icon 1318 enables a user to display a Chart for the underlying for the position. Icon 1319 enables a user to set an exit plan for the position. Icon 1320 enables a user to display an Option Chain for the underlying for the position. Icon 1321 enables a user to launch the StrategySEEK module for the position. Icon 1322 enables a user to Buy the position. Icon 1323 enables a user to Sell the position.

Figure 14:
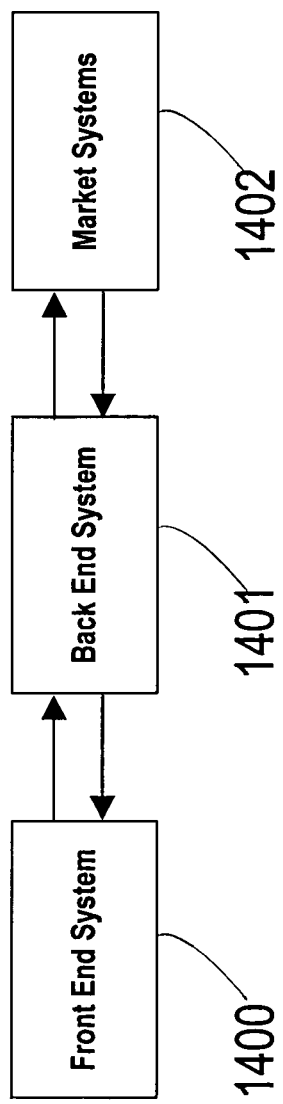
FIG. 14 is a diagram illustrating an embodiment of the high level parts of the trading system.

FIG. 14 is a diagram illustrating an embodiment of a trading system. In the example shown, front end system 1400 includes but is not limited to a user interface and components that support user interaction. Back end system 1401 includes but is not limited to mechanisms for storage and retrieval of user and account data as well as systems for storing historical market data and performing analytic calculations. Market systems 1402 include but are not limited to quote systems and order execution systems.

In various embodiments, front end system 1400, back end system 1401, and market system 1402 comprise one or more computer systems with one or more processors coupled to one or more memories. The one or more computer systems comprise one or more hardware boxes with one or more operating systems or one or more virtual systems.

Figure 15:
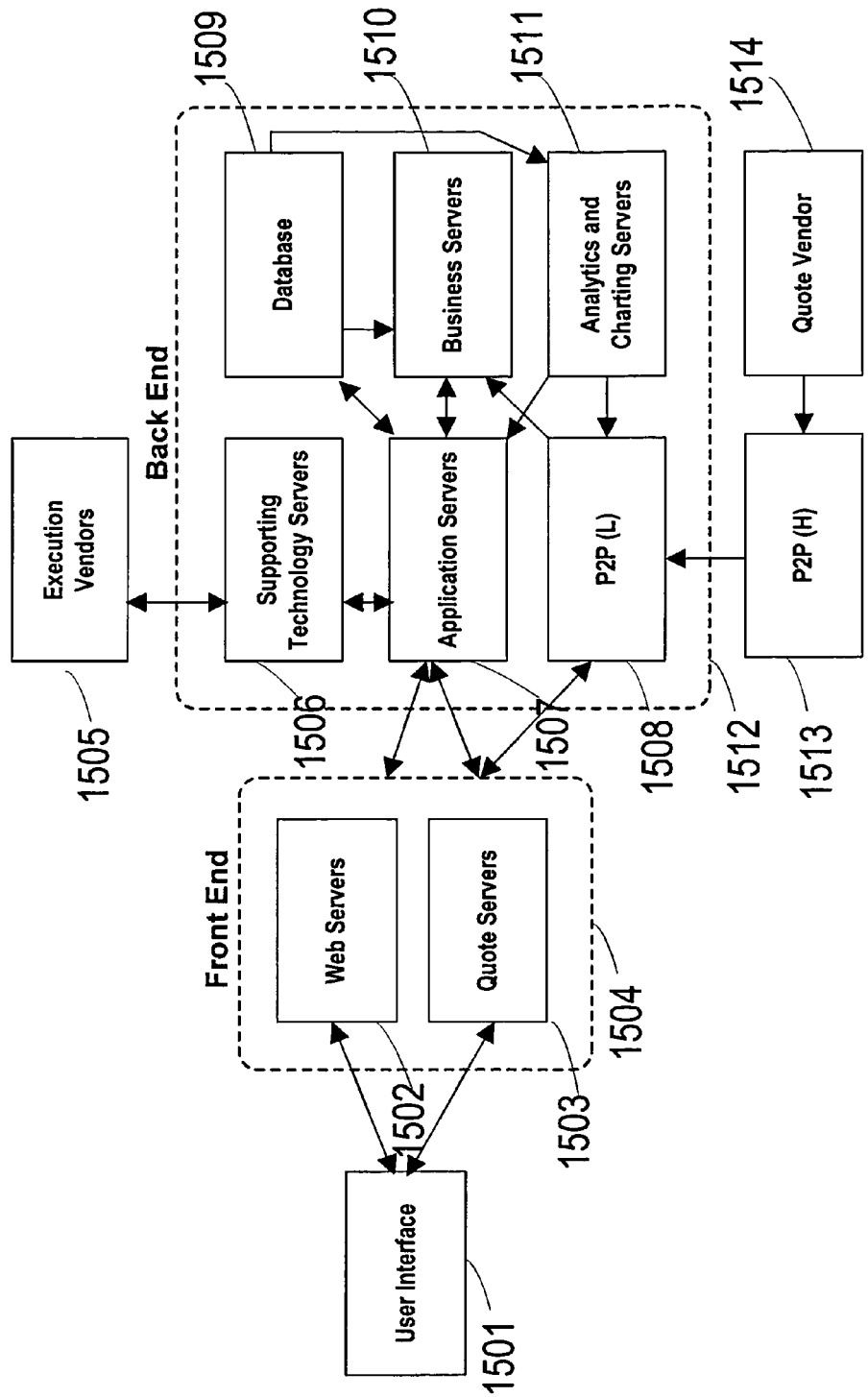
FIG. 15 is a flow diagram illustrating an embodiment of the high level components of the trading system.

FIG. 15 is a flow diagram illustrating an embodiment of a trading system. In the example shown, trading system includes user interface 1501, front end 1504, and back end 1512. Front end 1504 includes web servers 1502 and quote servers 1503. Quote servers 1503 stream market data to the user interface. Execution Vendors 1505 fill orders in the market from users as relayed via front end 1504 and back end 1512. Back end 1512 includes Supporting Technology Servers 1506; Application Servers 1507, which provide application functions and services; P2P(L) 1508, a peer to peer market data source; Database 1509, which stores all user data including but not limited to positions, orders, strategy groupings, exit plans and balances; Business Servers 1510; Analytics and Charting Servers 1511, whose functions include providing risk metrics for positions and price charts; P2P(H) 1513 comprises a market data source. Quote Vendor 1514 is the source for market price quotes.

Figure 16:
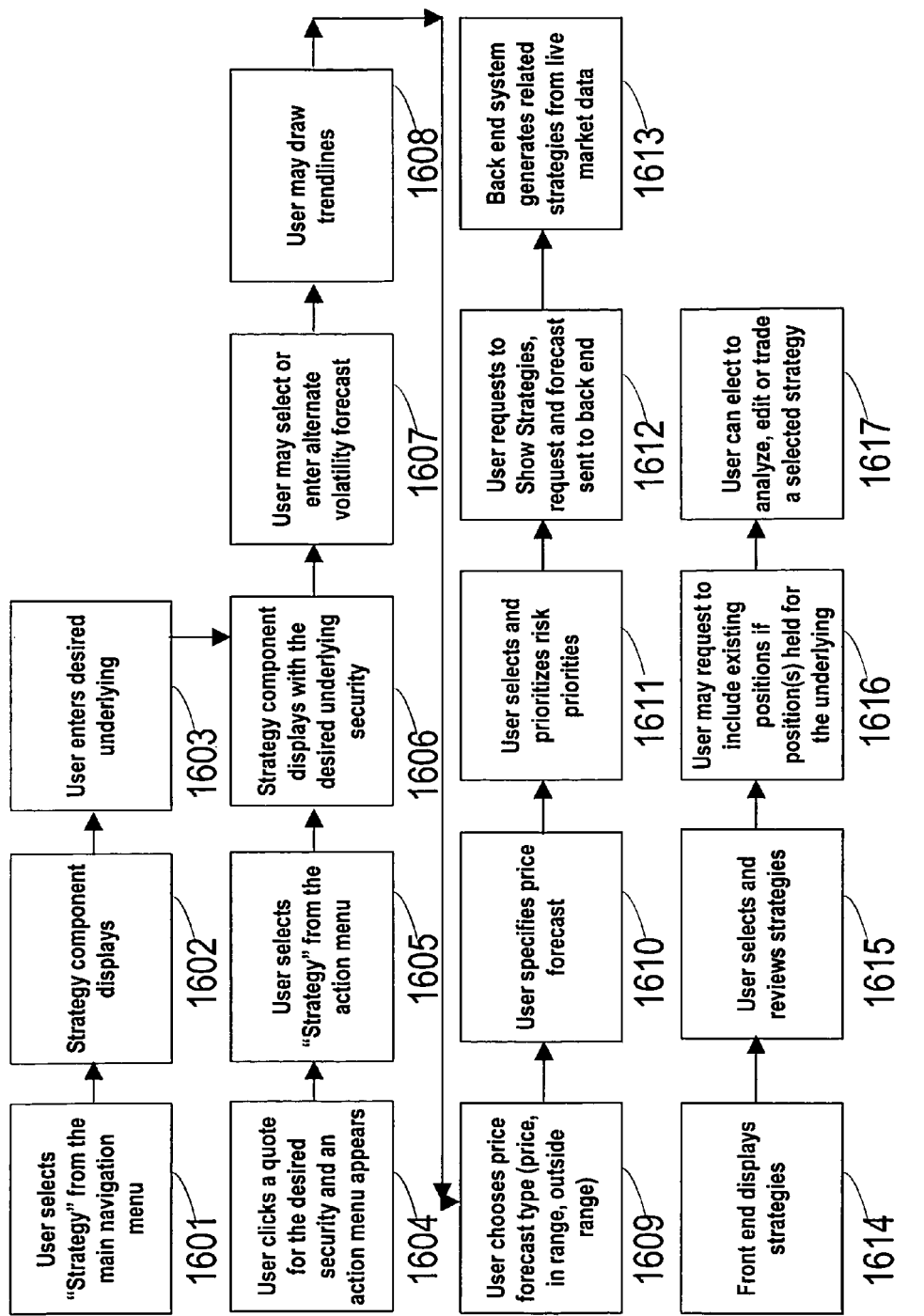
FIG. 16 is a flow diagram illustrating an embodiment of the process of using StrategySEEK to enter a forecast and act on generated strategies.

FIG. 16 is a flow diagram illustrating the use of Strategy Seek. In the example shown, in 1601 the user selects the StrategySEEK module from the main navigation window. In 1602, the Strategy component is displayed. In 1603, the user enters a desired underlying. For example, the user specifies an underlying security for the StrategySEEK module. 1604, 1605 and 1606 present an alternate way of invoking the StrategySEEK module. In 1604, a user clicks a quote for the desired security and an action menu appears. For example, a user selects a quote to select an underlying which causes a display of an Action Menu. In 1605, the user selects the "Strategy" icon to invoke the StrategySEEK module. In 1606, the strategy component displays with desired underlying security. In 1607, the user may alter the volatility forecast. In 1608, the user may draw trendlines. In 1609, the user chooses the price forecast type. The choices for the price forecast type include a price, price range or outside of a price range. In 1610, the user specifies the parameters of the price forecast. In some embodiments, a probability band is determined based at least in part on the forecast. In some embodiments, the probability band is displayed or caused to be displayed. In some embodiments, one or more strategies are determined and the one or more strategies are displayed or caused to be displayed. In 1611, the user selects and prioritizes the risk priorities. In some embodiments, an ordered list is determined based at least in part on a received priority and/or a received selection. In some embodiments, the ordered list is displayed or caused to be displayed. In 1612, the user requests to show the strategies; and the request and forecast are sent to the back end. In 1613, the Back End system generates related strategies from live market data. For example, the back end system stores the forecast and scans real-time market data to generate the recommended strategies and store them to a database. In 1614, the front end displays the strategies. In 1615, the user selects and reviews strategies. In some embodiments, a user may review the details of various strategies by clicking on them in a list. In 1616, the user may elect to include an existing position if one or more positions are held for the underlying. This will enable the legs of a selected existing position to be used to obtain the net recommended strategy. In 1617, the user can elect to analyze, edit, or trade a selected strategy. In some embodiments, the user may directly navigate from a selected strategy to functionality to edit the strategy, analyze the strategy, or place a trade for the strategy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for inputting a forecast and displaying an associated strategy for a trading system, comprising:
a processor configured to:
receive an indication of a volatility for an underlying investment;
determine a probability band based at least in part on the volatility, the probability band indicative of a likelihood of the underlying investment having a particular price at a particular future date;
cause a display of the probability band;
receive, via the displayed probability band, an indication of a selected forecast for an underlying investment, the selected forecast defining at least a future date and expected price of the underlying investment at the future date; and
cause a display of one or more strategies compatible with the selected forecast; and
a memory coupled to the processor and configured to provide the processor with instructions.

2. A system as in claim 1, wherein the selected forecast further defines a future range of dates and a range of prices over the future range of dates at which the underlying investment is expected to be at.

3. A system as in claim 1, wherein the selected forecast further defines a future range of dates and an excluded range of prices over the future range of dates at which the underlying investment is not expected to be at.

4. A system as in claim 1, wherein the selected forecast is input using a cursor in conjunction with the displayed probability band.

5. A system as in claim 1, wherein the selected forecast is input using a date input box associated with the displayed probability band and a price input box associated with the displayed probability band.

6. A system as in claim 1, wherein the indication of the volatility comprises a user input.

7. A system as in claim 1, wherein the indication of the volatility is associated with a drop down menu.

8. A computer implemented method for inputting a forecast and displaying an associated strategy for a trading system, comprising:
receiving, by an automated processor, an indication of a volatility for an underlying investment;
determining, by the automated processor, a probability band based at least in part on the volatility, the probability band indicative of a likelihood of the underlying investment having a particular price at a particular future date;
causing, by the automated processor, a display of the probability band;
receiving, by the automated processor via the displayed probability band, an indication of a selected forecast for the underlying investment, the selected forecast defining at least a future date and expected price of the underlying investment at the future date; and
causing, by the automated processor, a display of one or more strategies compatible with the selected forecast.

9. A non-transitory computer readable storage medium comprising computer instructions for:
receiving an indication of a volatility for an underlying investment;
determining a probability band based at least in part on the volatility, the probability band indicative of a likelihood of the underlying investment having a particular price at a particular future date;
causing a display of the probability band;
receiving, via the displayed probability band, an indication of a selected forecast for an underlying investment, the selected forecast defining at least a future date and expected price of the underlying investment at the future date; and
causing a display of one or more strategies compatible with the selected forecast.

10. A system as in claim 1 wherein the processor is further configured to:
receive an indication of an order of two or more risk priorities;
determine an ordered list based on the received order;
cause a display of the ordered list; and
cause a display of the one or more strategies further compatible with the ordered list.

11. A system as in claim 10, wherein one of the one or more risk priorities comprises targeting maximizing potential market gain.

12. A system as in claim 10, wherein one of the one or more risk priorities comprises targeting minimizing potential loss.

13. A system as in claim 10, wherein one of the one or more risk priorities comprises targeting maximizing potential profitability.

14. A system as in claim 10, wherein one of the one or more risk priorities comprises targeting maximizing potential percent market gain.

15. A system as in claim 10, further comprising receiving an indication of whether each of the one or more risk priorities is turned on or off.

16. A system as in claim 10, wherein the indication of the order comprises dragging and dropping one of the one or more risk priorities.

17. A system as in claim 10, wherein the one or more strategies include an existing underlying investment position.

18. A system as in claim 17, further comprising displaying an adjustment trade for one strategy of the one or more strategies, wherein the one strategy includes at least the existing underlying investment position.

19. A system as in claim 10, further comprising receiving an indication to select one of the one or more strategies, wherein the selection enables a user to perform one or more of the following: edit, analyze, or trade the selected strategy.

20. A computer implemented method as in claim 8 further comprising:
   receiving, by the automated processor, an indication of an order of two or more risk priorities;
   determining, by the automated processor, an ordered list based on the received order;
   causing, by the automated processor, a display of the ordered list; and
   causing, by the automated processor, the display of the one or more strategies further compatible with the ordered list.

21. The non-transitory computer readable storage medium as in claim 9 further comprising computer instructions for:
   receiving an indication of an order of two or more risk priorities;
   determining an ordered list based on the received order;
   causing a display of the ordered list; and
   causing the display of the one or more strategies further compatible with the ordered list.

* * * * *